United States Patent
Hosomi

(10) Patent No.: US 7,103,335 B2
(45) Date of Patent: Sep. 5, 2006

(54) RECEIVER USED IN SPREAD SPECTRUM COMMUNICATION SYSTEM

(75) Inventor: Takahiro Hosomi, Tokyo (JP)

(73) Assignee: NEC Corporation, Tokyo (JP)

( * ) Notice: Subject to any disclaimer, the term of this patent is extended or adjusted under 35 U.S.C. 154(b) by 1052 days.

(21) Appl. No.: 10/020,468

(22) Filed: Oct. 29, 2001

(65) Prior Publication Data

US 2002/0052187 A1    May 2, 2002

(30) Foreign Application Priority Data

Oct. 31, 2000    (JP)    ............... 2000-333313

(51) Int. Cl.
   H04B 1/06    (2006.01)
(52) U.S. Cl. .............. 455/234.1; 455/249.1; 455/253.2; 375/316
(58) Field of Classification Search ............ 455/234.1, 455/249.1, 253.2, 226.1, 226.2, 226.3, 127.2; 370/129, 130, 316, 345; 375/297, 345, 316
See application file for complete search history.

(56) References Cited

U.S. PATENT DOCUMENTS 5,758,271 A    5/1998    Rich et al.
5,999,559 A   12/1999    Takaki

FOREIGN PATENT DOCUMENTS

| JP | 8-8782 | 1/1996 |
| JP | 08-008782 | * 1/1996 |
| JP | 10-13282 | 1/1998 |
| JP | 10-013282 | * 1/1998 |
| JP | 11-298343 | * 10/1999 |
| JP | 11-313028 | * 11/1999 |
| JP | 11-355376 | * 12/1999 |

OTHER PUBLICATIONS

Japanese Office Action dated Mar. 4, 2003 with English language translation.

* cited by examiner

Primary Examiner—Melur Ramakrishnaiah
(74) Attorney, Agent, or Firm—Scully, Scott, Murphy & Presser, P.C.

(57) ABSTRACT

In a receiver used in the spread spectrum communication system, power of a base band signal which is obtained by A/D converting an output of a quadrature demodulator is detected by a base band signal power-detecting unit, where the quadrature demodulator demodulates an IF signal outputted from an AGC amplifier. The base band signal is despeaded by a despreading unit, and converted into a symbol rate signal, power of which is detected by a symbol rate signal power-detecting unit. An error rate of a desired wave is detected by an error rate-detecting unit on the basis of the symbol rate signal. Output signals of the base band signal power-detecting unit, the symbol rate signal power-detecting unit, and the error rate-detecting unit are supplied to an AGC amplifier-controlling unit which controls a gain of the AGC amplifier.

6 Claims, 1 Drawing Sheet

RECEIVER USED IN SPREAD SPECTRUM COMMUNICATION SYSTEM

FIELD OF THE INVENTION

The invention relates to a receiver used in a spread spectrum communication system, in which consumed electric power is reduced, sensibility in the receipt of an incident wave and the quality of a signal transmission are prevented from being deteriorated, and the stable receipt of message can be secured.

BACKGROUND OF THE INVENTION

In the conventional receiver used in the spread spectrum communication system of the direct sequence type, power of a base band signal is detected, and an intermediate frequency (IF, hereinafter) signal is amplified by an automatic gain control (AGC, hereinafter) amplifier so that power of the base band signal is kept to be constant. Accordingly, the IF signal is excessively amplified in case the signal to noise (S/N, hereinafter) ratio of the desired wave is high, and electric power consumed in the AGC circuit becomes high.

Especially, when the spread spectrum communication system is applied to the cellular telephone, since the AGC amplifier is always operative even when the receiver is in the standby state, it is very important to reduce electric power consumed in the receiving circuit from a view point of extension of a lifetime of batteries of the cellular telephone. Accordingly, an uncomplicated method for reducing electric power consumed in the receiver has been strongly desired.

Moreover, in the conventional receiver, since power of the base band signal is controlled depending an power of all the waves including the desired wave received by an antenna in an assigned frequency band, power of the symbol rate signal of the desired wave which is outputted from the despreader is not necessarily kept to be constant. Accordingly, in case that the signal to noise (S/N, hereinafter) ratio of the desired wave is low, explaining concretely in case that the other transmitting wave or an interference wave exists in the same frequency band as that of the desired wave, or power of the desired wave received by the antenna is lower that of thermal noise power, there arises an apprehension that the desired wave cannot be amplified satisfactorily, or the sensibility of the receipt of message and the equality of the signal transmission will be deteriorated.

SUMMARY OF THE INVENTION

Accordingly, it is an object of the invention to provide a receiver used in a spread spectrum communication system, in which consumed electric power is reduced, sensibility in the receipt of message and the quality of a signal transmission are prevented from being deteriorated, and the stable receipt of message can be secured.

According to the feature of the invention, a receiver used in a spread spectrum communication system comprises:

a base band signal power-detecting unit for detecting power of a base band signal which is obtained by analog to digital (A/D, hereinafter) converting an output of a quadrature demodulator, wherein the quadrate demodulator quadrature demodulates an intermediate frequency signal outputted from an AGC amplifier, a symbol rate signal power-detecting unit for detecting power of a symbol rate signal which is obtained by despreading the base band signal, an error rate-detecting unit for detecting an error rate of a desired wave on a basis of the symbol rate signal, and an AGC amplifier-controlling unit for controlling a gain of the AGC amplifier depending on outputs of the base band signal power-detecting unit, the symbol rate signal power-detecting unit and the error rate-detecting unit.

The AGC amplifier-controlling unit decreases the gain of the AGC amplifier, when S/N ratio of the desired wave is judged to be high on a basis of the output of the symbol rate signal power-detecting unit.

The AGC amplifier-controlling unit increases the gain of the AGC amplifier so that the output of the symbol rate signal power-detecting unit coincides with a reference symbol rate signal power, when a S/N ratio of the desired wave is judged to be low on a basis of the output of the symbol rate signal power-detecting unit.

The AGC amplifier-controlling unit decreases a predetermined reference symbol rate signal power, when an error rate of the desired wave detected on a basis of the symbol rate signal is low, and decreases the gain of the AGC amplifier so that the output of the symbol rate signal power-detecting unit coincides with the decreased reference symbol rate signal power.

The AGC amplifier-controlling unit increases a predetermined reference symbol rate signal power, when the error rate of the desired wave detected on a basis of the symbol rate signal is high, and increases the gain of the AGC amplifier so that the output of the symbol rate signal power-detecting unit coincides with the increased reference symbol signal power.

The AGC amplifier may be controlled on the basis of power of one of physical channels, without using the symbol rate signal power.

BRIEF DESCRIPTION OF THE DRAWINGS

The invention will be explained in more detail in conjunction with an appended drawings, wherein.

DESCRIPTION OF PREFERRED EMBODIMENT

Figure 1:
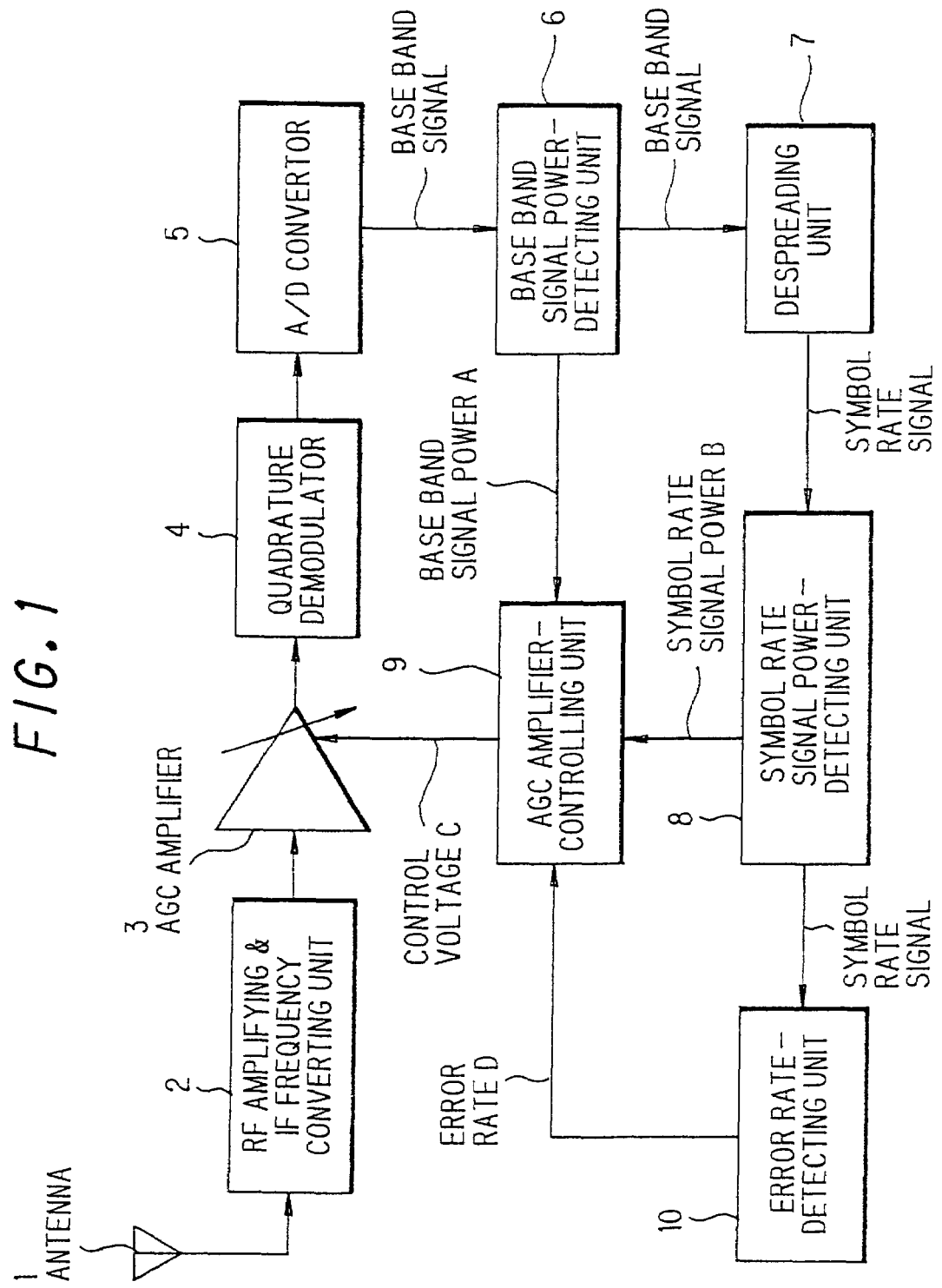
FIG. 1 is a block diagram of a receiver used in a spread spectrum communication system according to a preferred embodiment of the invention.

Hereafter, a preferred embodiment of the invention will be explained.

FIG. 1 is a block diagram for showing a structure of a receiver used in the spread spectrum communication system according to the invention.

A RF signal received by an antenna 1 is converted into an IF signal by a RF-amplifying and IF-converting unit 2. The IF signal is amplified by an AGC amplifier 3, and quadrature demodulated by a quadrature demodulator 4, an output of which is supplied to A/D converter 5 and converted into a digital signal. The digital signal is defined as a base band signal, and supplied to a base band signal power-detecting unit 6, which supplies a base band signal power A to and AGC amplifier-controlling unit 9. Moreover, the base band signal is also supplied to a despreading unit 7, and converted into a symbol signal. The symbol rate signal is supplied to a symbol rate signal power-detecting unit 8, an output of which is supplied to the AGC amplifier-controlling unit 9 as a symbol rate signal power B. Furthermore, the symbol rate signal is also supplied to an error rate-detecting unit 10.

The error rate-detecting unit 10 detects an error rate D of the desired wave on the basis of the symbol rate signal, and an output of the error rate-detecting unit 10 is supplied to the AGC amplifier-controlling unit 9 as an error rate signal D. When the error rate D of the desired wave becomes high, the AGC amplifier-controlling unit 9 increases a reference symbol rate signal power E. When the error rate D of the desired wave becomes sufficiently low, the AGC amplifier-controlling unit 9 decreases the reference symbol rate signal power E. The AGC amplifier controlling unit 9 controls a control voltage C so that the symbol rate signal power B becomes equal to the reference symbol rate signal power E, using the base band signal power A and the symbol rate signal power B. ELER (Flame Error Ratio) or BER (Bit Error Ratio) can be enumerated as an example of the error rate of the desired wave.

As mentioned in the above, in the receiver used in the spread spectrum communication system of the direct sequence type according to the invention, since the AGC amplifier is controlled on the basis of the error rate of the desired wave and the symbol rate signal power, electric power consumed in the receiver is decreased, and the receipt of message is stabilized.

Moreover, when the S/N ratio of the desired wave detected on the basis of the symbol rate signal power is high, since the gain of the AGC amplifier is decreased depending on the symbol rate signal power derived from the output of the despreading unit as well as on the base band signal power, electric power consumed in the AGC circuit can be decreased, and that consumed in the receiver is decreased in its turn.

In the receiver according to the invention, the symbol rate signal power is detected, and, when the S/N ratio of the desired wave detected on the basis of the symbol rate signal power is low, the gain of the AGC amplifier is increased so that the symbol rate signal power coincides with the reference symbol rate signal power. Accordingly, decrease of sensibility in the receipt of message caused by insufficiency of the S/N ratio of the desired wave can be avoided, and stable sensibility in the receipt of message can be secured, even when the S/N ratio of the desired wave is low.

The reference symbol rate signal power is decreased in case that the error rate of the desired wave is low, and increased in case that the error rate of the desired wave is high. Accordingly, when the error rate of the desired wave is low, since the gain of the AGC amplifier keeps the irreducible minimum, electric power consumed in the receiver is decreased. Moreover, when the error rate of the desired wave is high, since the gain of the AGC amplifier is increased, the quality of the signal transmission is stabilized.

In case that the error rate of the desired wave is low, since the symbol rate signal power is decreased and the number of bits of the signal is decreased, the amount of calculation in the base band signal power-detecting unit 6 is decreased, and electric power consumed therein can be decreased.

Moreover, since deterioration in sensibility caused by increase of the number of the multiplexed channels in the carrier frequency band keeps within the limited value, the number of the multiplexed channels in the same frequency band can be expected to be increased.

The gain of the AGC amplifier can be controlled on the basis of power of one of physical channels, without using the symbol rate signal power.

As mentioned in the above, the receiver used in a spread spectrum communication system according to the invention is provided with abase band signal power-detecting unit for detecting power of a base band signal obtained by AID converting an output of a quadrature demodulator which demodulates an IF signal outputted from the AGC amplifier, a symbol rate signal power-detecting unit for detecting power of a symbol rate signal which is obtained by despreading the base band signal, and an error rate-detecting unit for detecting an error rate of the desired wave on the basis of the symbol rate signal. Moreover, a gain of the AGC amplifier is controlled depending on the outputs of the base band signal power-detecting unit, the symbol rate signal power-detecting unit, and the error rate-detecting unit. Accordingly, electric power consumed in the receiver is decreased, and receipt of message is stabilized.

Since the AGC amplifier-controlling unit decreases the gain of the AGC amplifier, when a S/N ratio of the desired wave is judged to be high on a basis of the output of the symbol rate signal power-detecting unit, electric power consumed in the receiver is certainly decreased.

Since the AGC amplifier-controlling unit increases the gain of the AGC amplifier so that the output of the symbol rate signal power-detecting unit coincides with a reference symbol rate signal power, when a S/N ratio of the desired wave is judged to be low on a basis of the output of the symbol rate signal power-detecting unit, the receipt of massage can be certainly stabilized.

Since the AGC amplifier-controlling unit decreases a predetermined reference symbol rate signal power, when an error rate of the desired wave detected on a basis of the symbol rate signal is low, and decreases the gain of the AGC amplifier so that the output of the symbol rate signal power-detecting unit coincides with the decreased reference symbol rate signal power, electric power consumed in the receiver is certainly decreased.

Since the AGC amplifier-controlling unit increases a predetermined reference symbol rate signal power, when the error rate of the desired wave detected on a basis of the symbol rate signal is high, and increases the gain of the AGC amplifier so that the output of the symbol rate signal power-detecting unit coincides with the increased reference symbol signal power, the receipt of message can be certainly stabilized.

Since the gain of the AGC amplifier is controlled on the basis of power of one of physical channels, without using the symbol rate signal power, electric power consumed in the receiver is decreased, and the receipt of message is stabilized.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A receiver used in a spread spectrum communication system, comprising:
    a base band signal power-detecting unit for detecting power of a base band signal which is obtained by analog to digital (A/D, hereinafter) converting an output of a quadrature demodulator,
    wherein said quadrate demodulator quadrature demodulates an intermediate frequency signal outputted from an automatic gain control (AGC, hereinafter) amplifier,
    a symbol rate signal power-detecting unit for detecting power of a symbol rate signal which is obtained by despreading said base band signal,
    an error rate-detecting unit for detecting an error rate of a desired wave on a basis of said symbol rate signal, and
    an AGC amplifier-controlling unit for controlling a gain of said AGC amplifier depending on outputs of said base band signal power-detecting unit, said symbol rate signal power-detecting unit and said error rate-detecting unit.

2. A receiver used in a spread spectrum communication system according to claim 1, wherein:

said AGC amplifier-controlling unit decreases said gain of said AGC amplifier, when a signal to noise (S/N, hereinafter) ratio of said desired wave is judged to be high on a basis of said output of said symbol rate signal power-detecting unit.

3. A receiver used in a spread spectrum communication system according to claim 1, wherein:

said AGC amplifier-controlling unit increases said gain of said AGC amplifier so that said output of said symbol rate signal power-detecting unit coincides with a reference symbol rate signal power, when a S/N ratio of said desired wave is judged to be low on a basis of said output of said symbol rate signal power-detecting unit.

4. A receiver used in a spread spectrum communication system according to claim 1, wherein:

said AGC amplifier-controlling unit decreases a predetermined reference symbol rate signal power, when an error rate of said desired wave detected on a basis of said symbol rate signal is low, and decreases said gain of said AGC amplifier so that said output of said symbol rate signal power-detecting unit coincides with said decreased reference symbol rate signal power.

5. A receiver used in a spread spectrum communication system according to claim 1, wherein:

said AGC amplifier-controlling unit increases a predetermined reference symbol rate signal power, when said error rate of said desired wave detected on a basis of said symbol rate signal is high, and increases said gain of said AGC amplifier so that said output of said symbol rate signal power-detecting unit coincides with said increased reference symbol signal power.

6. A receiver used in a spread spectrum communication system according to claim 1, wherein:

said AGC amplifier-controlling unit is supplied with an output of a means for detecting power of one of physical channels instead of said output of said symbol rate signal power-detecting unit.

* * * * *